United States Patent
Gaffney

(10) Patent No.: US 7,311,362 B2
(45) Date of Patent: Dec. 25, 2007

(54) TORSO SUPPORTING SEATING SYSTEM

(76) Inventor: William John Gaffney, 2900 Connecticut Ave., NW., Apt. 420, Washington, DC (US) 20008-1411

( * ) Notice: Subject to any disclaimer, the term of this patent is extended or adjusted under 35 U.S.C. 154(b) by 0 days.

(21) Appl. No.: 11/328,154

(22) Filed: Jan. 10, 2006

(65) Prior Publication Data

US 2006/0181136 A1    Aug. 17, 2006

Related U.S. Application Data

(60) Provisional application No. 60/645,013, filed on Jan. 21, 2005.

(51) Int. Cl.
*A47C 31/00*        (2006.01)
(52) U.S. Cl. .................. 297/488; 297/195.1; 280/288.4
(58) Field of Classification Search ................ 297/487, 297/488, 195.1; 280/288.4
See application file for complete search history.

(56) References Cited

U.S. PATENT DOCUMENTS

| | | | | |
|---|---|---|---|---|
| 575,787 A | * | 1/1897 | Voitek ..................... | 280/304.1 |
| 588,881 A | * | 8/1897 | Roberts ..................... | 297/488 |
| 626,852 A | * | 6/1899 | Bemis ..................... | 280/244 |
| 4,978,167 A | * | 12/1990 | Harvey ................... | 297/215.13 |
| 6,050,584 A | * | 4/2000 | Sibson ..................... | 280/283 |
| 6,076,846 A | * | 6/2000 | Clardy ..................... | 280/290 |

\* cited by examiner

*Primary Examiner*—Anthony D. Barfield

(57) ABSTRACT

A seating system providing front support and rear support for the human torso. The front support is by an anterior support device having two pads, which pads are laterally adjustable to fit the different spreads in the iliac crests of different persons. Preferably, between the first two pads is located a third pad with adjustability to accommodate the differing abdominal protrusions occurring in different persons. The three pads are concavely shaped and receive the convex shapes of the anterior waist of a person. The anterior support pads are hinged to arc forward and rearward. The anterior support pads are released to arc by retracting a cable, which retracting is caused by the pressing of a lever. The anterior support device has an assembly for installation on a bicycle; other assemblies for other installations can be made. A posterior support device is complementarily combined with the anterior support device.

15 Claims, 5 Drawing Sheets

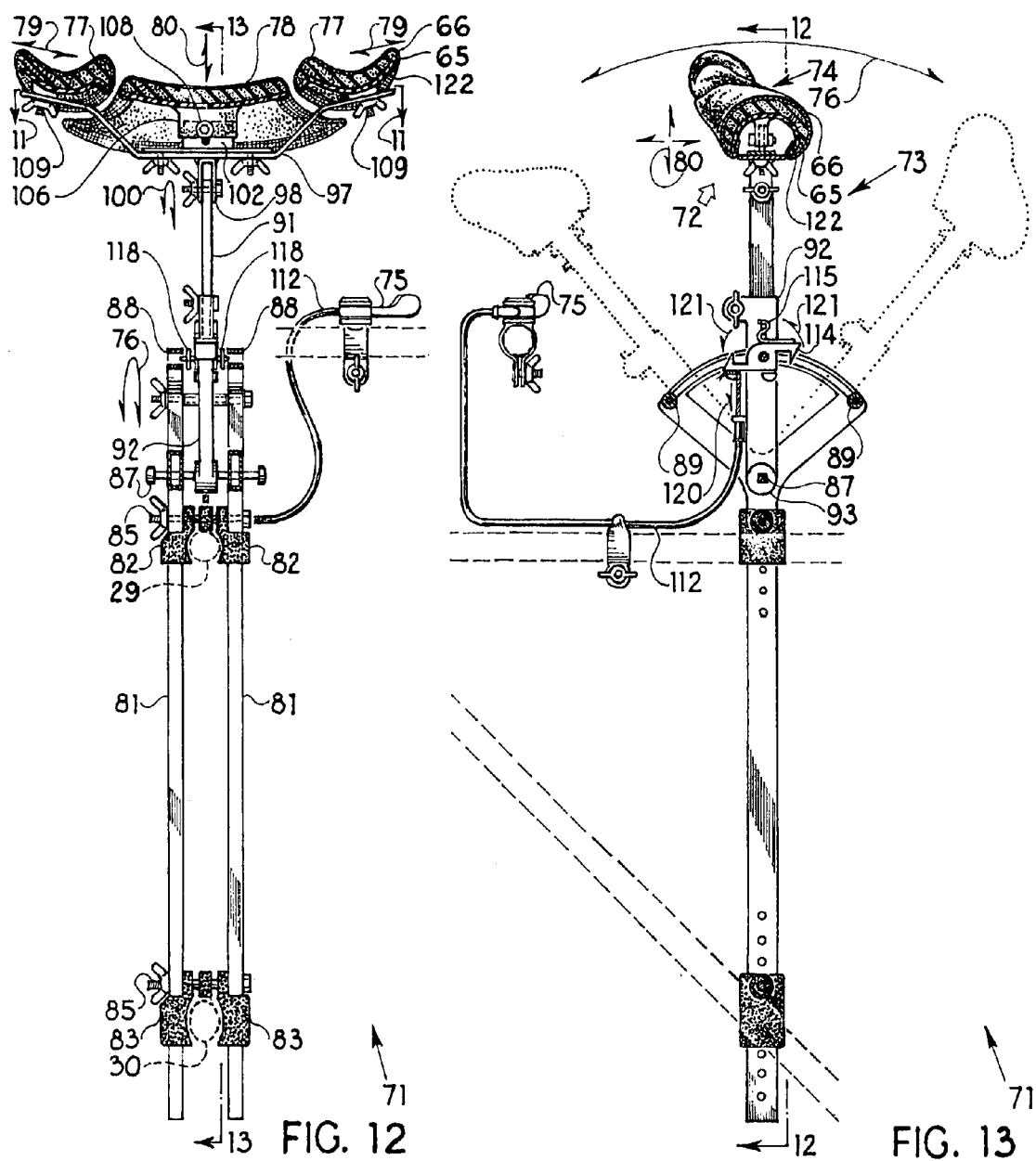

TORSO SUPPORTING SEATING SYSTEM

CROSS REFERENCE TO RELATED APPLICATIONS

This application claims the benefit, in accordance with 35 U.S.C. §119(e), of U.S. Provisional Patent Application Ser. No. 60/645,013, filed Jan. 21, 2005 by the present inventor, and which provisional application is hereby incorporated by reference.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR COMPUTER PROGRAM COMPACT DISC APPENDIX

Not Applicable.

BACKGROUND OF THE INVENTION

1. Field of Endeavor

The present invention relates generally to providing stable support for a person's torso while simultaneously allowing a full range of motion for a person's limbs; the present invention relates particularly to providing stable support for a cyclist's body while simultaneously accommodating the full range of a cyclist's body movements, and accomplishing improvements in both comfort and mechanical efficiency for a cyclist.

2. Description of Information Known

Bicycles popularly appeared as a form of self-propelled vehicle during the early nineteenth century. These early vehicles were characterized by two wheels aligned in the direction of travel of the vehicle. From the generative forms of the 'hobby horse', up to the present day, bicycle seats have predominantly taken the form of a device oriented on the longitudinal axis of the cycling vehicle. These prior forms of seating were intended to be straddled by the user, with the weight of the user's body being borne between the user's legs, on the underside of the body's pelvis.

The most common form of contemporary bicycle seats are fundamentally similar to the forms of seats used during the Nineteenth Century. The most prevalent form of contemporary bicycle seat is a saddle form of seat. The contemporary saddle forms of bicycle seats share a common generic art. The contemporary saddle form of a bicycle seat is typically oriented with the long dimension of the seat aligned on the longitudinal axis of the frame of the cycling vehicle. The saddle seat is then straddled by the cyclist in the process of riding a bicycle.

The configuration of a saddle form of seat derives from the shape of the space between the cyclist's legs, which shape is formed when a cyclist is pedalling a bicycle while in a seated posture. In the common saddle form of a seat the user's body weight is, in greater or lesser amounts, supported on the horn of the saddle seat, which horn projects toward the front end of the bicycle. The user's body weight is then concentrated on the underside of the pelvis between the user's legs. Being located between the cyclist's legs, the saddle form of seat provides both a centered line of balance for the cyclist, and a supporting surface for the body weight of the cyclist. The configuration and location of a saddle seat form are consistent with most user requirements presented in the function of both historical and contemporary bicycles.

The standards for the contemporary bicycle seat form have been established according to a number of user's needs, including those needs listed here following.

1. Cyclists have a need for a seat to minimize the amount of contact between the seat and the back of a cyclist's upper leg muscles, which muscles are repeatedly contracted by a cyclist in the process of pedalling a bicycle while in a seated posture.
2. Cyclists have a need for a seat which allows a cyclist to have unrestricted leg motion in the leg movements employed in pedalling a cycling vehicle.
3. Cyclists have a need for a seat which allows a cyclist the freedom of body movement to rise from, and descend onto, a cycling seat without impediment.
4. Cyclists have a need for a seat which allows positioning of a cyclist's body such that the cyclist can achieve the maximally efficient transfer of force from the legs of the cyclist to the pedals of the bicycle.
5. Cyclists have a need for a seat which allows a cyclist to descend from the seat to a standing position on the ground, while remaining in a ready-position to remount the bicycle and resume movement on the bicycle.
6. Cyclists have a need for a seat to give supplemental support to a cyclist's lateral balance while the cyclist is using a cycling vehicle in motion.

There can be additional related needs for a cyclist which needs can indicate additional standards for both function and comfort in determining an improved form of seating support for cycling vehicles.

For more than a century the predominant saddle form of cycling seats has been accepted as sufficiently fulfilling the majority of seating needs for cyclists. There exist particular difficulties in existing seat forms that have not been remedied by the existing art. One difficulty of the existing art is the discomfort for the user of a typical saddle type of seat, that results from the pressure that concentrates in the area of the pubic symphysis, between the user's legs. A second difficulty of saddle-type seats is that of remaining seated while inclining the body to a posture sufficiently forward on the seat that the cyclist's legs can more effectively apply increased force to the pedals of a bicycle. A third difficulty of saddle-type seats is that saddle seats provide no stabilizing contact with the body of a cyclist when a cyclist is pedalling a cycling vehicle in an erect posture. Attempts at resurfacing and configurationally modifying the saddle form of seats have achieved varying degrees of success in relieving discomfort caused to cyclists by the saddle form of seat.

Because bicycles have most commonly served as recreational vehicles, a lesser level of seating support has generally been accepted as adequate for the purposes of cycling vehicles. Attempts have increasingly been made to promote cycling vehicles to serve the purpose of personal transportation. Efforts to apply cycling to the purpose of personal transportation have raised awareness of the need for improvements in the function and comfort of cycle seating. It is in the understanding of new and higher standards for the function and comfort of cycle seating that new and better improvements in cycle seating can be set forth over the existing art of the field.

Existing attempts at alternative seat forms have frequently combined improvement by one standard of seat function with a concomitant decline according to a different standard of use for cycle seating. In the prior art, there is seen neither a complete understanding of, nor a complete integration of, a system of support for the body of a cyclist. The art of the present invention meets particular standards of seating support, which standards have been previously recognized in numerous other and existing inventions. Examples of prior art inventions, which inventions address standards for body support related to the purposes of the present invention are listed here following.

1. Examples of patent content attempting a supported body posture for improving pedalling efficiency include the following:

| Tsuge | U.S. Pat. No.: U.S. Pat. No. 6,631,948 B1, | issued Oct. 14, 2003 |
|---|---|---|
| Yifrah and Golan | Int. Pub. No.: WO2004/007270 A1, | published Jan. 22, 2004 |
| Urban | U.S. Pub. No.: US2004/0051274 A1, | published Mar. 18, 2004 |

2. Examples of patent content attempting the implementation of an anterior support for a forward-leaning posture include the following:

| Reyes | U.S. Pat. No.: 5,669,860, | issued Sep. 23, 1997 |
|---|---|---|
| Clark | U.S. Pat. No.: 5,971,485, | issued Oct. 26, 1999 |
| Judkins | U.S. Pat. No.: 6,131,935, | issued Oct. 17, 2000 |

3. Examples of patent content attempting the inclusion of ergonomic considerations in an anterior torso support include the following:

| Workman et al. | U.S. Pub. No.: US2002/0121755 A1, | published Sep. 05, 2002 |
|---|---|---|
| Kastarlak | U.S. Pub. No.: US2004/0056519 A1, | published Mar. 25, 2004 |
| Kropa | U.S. Pub. No.: US2004/0245836 A1, | published Dec. 09, 2004 |

4. An example of patent content proposing a posterior support with a raised and centered ridge with concave curved sides includes the following:
Terranova—U.S. Pat. No. 4,773,705, issued Sep. 27, 1988
5. Examples of patent content proposing the use of an angled plane of support in a posterior application include the following:

| White | U.S. Pat. No.: U.S. Pat. No. 6,361,108 B1, | issued Mar. 26, 2002 |
|---|---|---|
| Schmidt | U.S. Pat. No.: U.S. Pat. No. 6,805,322 B2, | issued Oct. 19, 2004 |

The current state of the art of cycle seating can be related to the current state of analysis of cycle seating. The discomfort associated with saddle types of bicycle seats is conventionally described as being caused by the downward force of a user's body weight on the surface of a cycle seat. As a cyclist moves further forward on a saddle type of seat, the seat provides a decreasing area of supporting surface for a cyclist. A result of a changing area of seating surface is that a cyclist's body weight is supported by varying areas of seating surface during the use of a typical saddle type of seat. There exists a more complete and precise description of the cause for a cyclist's discomfort in the use of a saddle type of seat. This description, being both more complete and more precise, leads to improvements in support for the body of a cyclist, which improvements are beyond the art of existing seat forms.

It is fundamental to the present invention to formulate a more complete and precise understanding of the seating needs that are most appropriate to the body of a cyclist. It is a purpose of the present invention to provide a seating system, which system accomplishes both a more effective and a more integrally resolved system of support for the body of a cyclist.

BRIEF SUMMARY OF THE INVENTION

The present embodiment of the invention solves the difficulty of providing cycling seating, which seating combines improvements of both comfort and utility over the prior art of the field. The present invention of a seating system results from a refinement in the understanding of a cyclist's need for body support when a cyclist is engaged in the movements required to operate a cycling vehicle. The present invention provides support for a cyclist in two separate locations on the body of the cyclist. One surface of support contacts the inferior posterior area of the hips of a cyclist. The second supporting surface contacts the cyclist along a band of support across the anterior face of a cyclist's waist. The mutually complementary combination of both posterior and anterior support holds the body of a cyclist in a stable position, without the need for a weight-bearing surface to be placed between the legs of a cyclist.

The rear support for the cyclist is in the form of a posterior support device. The posterior support surface contacts the cyclist at the inferior posterior prominences of the ischial bones, above the backs of the legs of the cyclist. The posterior support device includes no forwardly projecting seat horn for the purpose of body support. Such a seat horn is the source of pressure on the perineum of the cyclist. On the configuration of the posterior support surface is a raised and centered ridge. The shape of the ridge contacts the body of the cyclist between the gluteus maximus muscles and just below the inferior tip of the coccyx bone.

The assembly of component parts for the posterior support device is similar to the assembly of component parts found in the majority of contemporary saddle-type bicycle seats. The support surface is an assembly of three materials together; a plastic base platform is surfaced with a layer of foam and a fabric cover is fitted over both the foam layer and the plastic platform. Attached to the underside of the plastic platform is a dual rail carriage made of structural rods. This type of dual rod carriage is similar to the conventional attachment structure, which type of structure is a standardized convention in the bicycle industry. The dual rod carriage allows the posterior support device to be attached to the top of a bicycle seat stem by the application of a clamping device. The clamping device is also of a standardized type with characteristics conventional within the bicycle industry.

The front support for the body of a cyclist comes from an anterior support device. The front surface of support for the cyclist is a concave band of support across the front of the waist of the cyclist. The concave, or anterior, waist support is made up of a waist support plate holding two lateral pads and a medial surface located between the lateral pads. The band of the concave waist support is located on, and between, the anterior crests of the iliac bones of the cyclist. The lateral pads are positioned to contact with, and shaped to conform to, the faces of the iliac crests. A supplemental medial support surface is located between the lateral pads; the medial support surface augments support of the user's body weight along a width of line across the abdomen. The line for contact of the medial surface is at the bottom edge of the abdominal fat pad, which line for contact is equidistant between the navel and the superior surface of the bones of the pubic symphysis.

The assembly of parts for the anterior support device are herein described, beginning with the concave waist support. The anterior support device is held in place by an assembly of adjustable parts, which parts are connected to the crossbars of the frame of a bicycle. The surfaces of the concave waist support are held together by a waist support plate, which plate, serving as a generally horizontal structural member, extends across the width of a cyclist's hips. The waist support plate allows for the adjustable positioning of the surfaces of the concave waist support. The waist support plate is connected to a length-adjustable extension bar. The extension bar connects to an arcing tube, the extension bar and the arcing tube together serving as a buttress member. The arcing tube is movable in an arcing pattern of both upward and downward movement. The arcing tube, being connected by parts to the concave waist support, is caused to arc up and down with the torso of a cyclist, as the cyclist rises from, and descends onto, the posterior support surface. The arcing tube moves within the limits of the arc guides, which guides are located near the upper crossbar of the bicycle. The arc guides are secured to the crossbars of the bicycle frame by the vertical tubes, which tubes are positioned on either side of the crossbars of the bicycle frame.

The functional service of the seating system is described herein following. When a cyclist is in a seated posture, the concave waist support is in a descended position. The concave waist support, in the descended position, provides an angle of support upward and back to the waist of the cyclist. In counter directional support, the posterior support surface provides an angle of support upward and forward at the inferior posterior surfaces of the hips of the cyclist. Together, the anterior and posterior support devices combine angles of support to hold the body of the cyclist stable when the cyclist is in a seated posture.

The functional service of the seating system is further described herein following. When a cyclist rises from the posterior support surface to move into a standing posture for cycling, the concave waist support rises up and forward along with the rising and forward movement of the hips of the cyclist. When a cyclist is cycling in a standing posture the concave waist support continues to provide support for the body of the cyclist, as the cyclist is able to lean forward into the concave waist support. When a cyclist returns to a seated posture, the anterior waist support may be left in an upright position; the anterior waist support may alternatively be dropped back downward to a descended position, in which position the waist support resumes giving support to the body of a cyclist in a seated posture.

The mechanics of movement for the anterior support device is described herein following. At the base of the arcing tube is located a spring hinge with a fixed axle. The directional urgency of the spring hinge is toward the descended and rearward position, where the anterior support is set against the waist of the cyclist. The anterior waist support is manually released from both the raised forward, and the lowered rearward positions, by the cyclist. The anterior waist support is released by act of the cyclist pressing the release lever for anterior waist support. The release lever is located on the bicycle handlebars. The anterior waist support can, upon release thereof, be moved back to the raised forward position by effect of a forward directed force on the anterior waist support.

There are numerous advantages found in, and original to, the present invention. The forward inclination in seating posture induced for a cyclist by the present seating system results in improvements in body balance and pedalling force over postures induced by the existing art of the field. The present invention eliminates difficulties of perineal and leg discomfort, which discomfort results from points of surface contact with the body of a cyclist, when a cyclist is seated on existing cycling seats. When a cyclist is cycling in a standing posture, the present invention provides additional advantages of function and comfort over existing cycling seats. A cyclist cycling in a standing posture is able to employ the anterior waist support as a surface against which the cyclist may lean varying amounts of body weight. Leaning against the anterior support surface adds efficiency to pedalling movements by allowing the cyclist to vary the amount of body weight on the pedals, and to vary the angle of incline of the body while pedalling. Supporting the body weight of a cyclist in both standing and seated pedalling postures improves cycling efficiency by relieving the arms and shoulders of the work of supporting the upper body and the work of holding the bicycle frame in opposition to side to side movement during pedalling. The oblique angles of support provided by the anterior and posterior support surfaces create a cradling effect on the hips of the cyclist and diminish the level of impact forces at the seating surfaces. Impact forces at the seating surfaces of bicycles are the result of cycling over irregular conditions on the surface of the ground.

The ergonomic advantages of the anterior waist support result from the calculated positioning of the supporting surfaces against the front of the torso of a cyclist. The positioning and the concave shape of the lateral support pads of the concave waist support are determined according to the protuberances of the iliac crests. The positioning of the lateral pads avoids interference with muscle functions, and results in stable support for the torso of a cyclist. The lateral pad locations permit a full range of torso movement for seated cycling, which range is from a rearward leaning posture to a bent-forward posture. The location of the supplemental medial support surface of the concave waist support is calculated to avoid abdominal surfaces, which surfaces effect discomfort when receiving contacting pressure. The lower abdominal wall, just above the pubic symphysis, contains organs of digestion and reproduction, which organs are sensitive to external pressure. The bones of the pubic symphysis are located at the base of the lower abdomen. The bones of the pubic symphysis do not sustain contacting pressure without resulting in discomfort at the location of the contacting pressure. The medial support also avoids contact with the upper abdominal wall, which abdominal wall must be left free to expand and contract without impediment, in order for full respiratory function to be allowed. Analysis of the anatomy of the anterior torso indicates an optimal line on which to place anterior supports, which line for support placement allows for both comfort and a full range of necessary movement for a cyclist. The indicated line of placement for supports is the line used for the supports employed in the anterior support device of the present invention.

The present invention provides the effects of stability and comfort for a cyclist, by establishing a secure support for the positioning of the torso of the cyclist on the cycling vehicle. By being established in a stable position on the cycling vehicle, the cyclist is able to operate the cycling vehicle with a minimum of unnecessary body movements; the cyclist is also able to achieve a more efficient transfer of pedalling force; the cyclist further experiences an increased sense of integrated involvement in the operation of a cycling vehicle.

BRIEF DESCRIPTION OF THE SEVERAL VIEWS OF THE DRAWINGS

This embodiment of the present invention, including the nature and purposes of the present invention, will be better understood by making reference to the hereinbelow appended drawings, in conjunction with the 'Detailed Description of the Invention', also appended hereinbelow. The drawings of the present invention, wherein like designations denote like elements of the invention, are listed here following in which:

FIG. 11 depicts a sectional plan view of the anterior support device of the seating system, this sectional plan view being correspondingly aligned on sheet number 4/5, in a graphic relationship directly above the posterior section view of FIG. 12, in accordance with the present invention;

FIG. 12 depicts a posterior section view of the anterior support device of the seating system, this posterior section view being correspondingly aligned on sheet number 4/5 in a graphic relationship directly below the sectional plan view of FIG. 11, and in a graphic relationship directly beside the lateral section view of FIG. 13, in accordance with the present invention;

FIG. 13 depicts a lateral section view of the anterior support device of the seating system, this lateral section view being correspondingly aligned on sheet number 4/5 in a graphic relationship directly beside the posterior section view of FIG. 12, in accordance with the present invention;

DETAILED DESCRIPTION OF THE INVENTION

Figure 1:
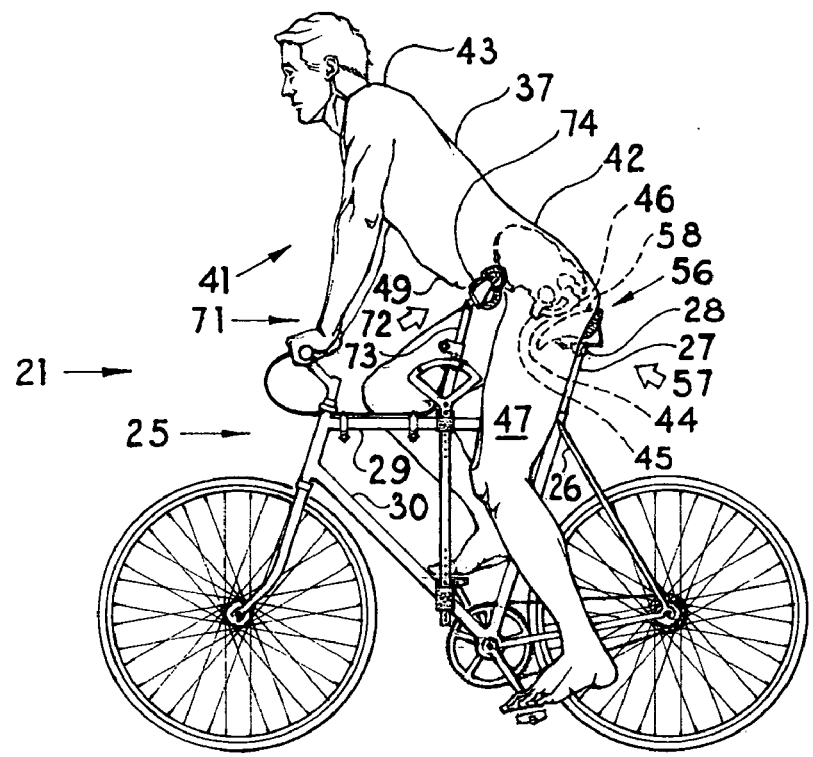
FIG. 1 depicts a lateral elevation view of a bicycle, on which bicycle is installed the present seating system, which seating system is depicted in a position to support the torso of a cyclist, when the posture of the cyclist is a posture of being seated with an upright body position while riding on the bicycle, in accordance with the present invention.

Referring to the drawings in detail, wherein like numerals denote like elements, attention is directed to FIG. 1, being a lateral elevation view of the present invention 21 of a seating system 21 installed on a bicycle 25 and being used by a cyclist 41 in a seated-upright posture, and which cyclist 41 is being supported by the present invention 21. FIG. 1 depicts the relationship of the two principal parts of the present invention 21 which parts are the posterior support device 56 and the anterior support device 71. The posterior support device 56 is depicted being connected to a conventional bicycle seat stem 27 by the use of an industry-standard dual rod bicycle seat clamp 28. The anterior support device 71 is depicted installed on the upper crossbar 29 and the lower crossbar 30 of a bicycle frame 26. It is seen that a basic principle of the present invention 21 is the arrangement of support for the hips 42 of a seated cyclist 41 at a posterior upward angle 57 from the posterior support surface 58 while simultaneously providing a complementary angle support of support 72 for the hips 42 of a cyclist 41 at an anterior upward angle 72 from the anterior waist buttress 73. It is further a principle of the present invention 21 that the hips 42 of a cyclist 41 can be analyzed as a generally cylindrical form, which form can be stably supported by the placement of an upward angle of posterior support 57 and an upward angle of anterior support 72 on either underside of the cylindrical form. The posterior support surface 58 and the concave waist support 74 combine to form a stable cradling of the cyclist's 41 hips 42. The drawing of FIG. 1 further shows that this analysis of general anatomical conditions leads to an arrangement of the surfaces of contact on the cyclist's 41 hips 42, which surfaces of contact are an improvement on the existing art, which art conventionally relies on a vertically directed support of the cyclist 41 by placement of a support between the legs 47 of the cyclist 41. A significant improvement of the present invention 21 over existing art is that the cyclist 41 is securely supported in a forward-leaning posture, which posture is more highly efficient for the body of a cyclist 41 in pedalling a bicycle 25. The anterior support device 71 also relieves other body muscles of doing the work of supporting the cyclist's 41 upper body weight, which other muscles are those of the shoulders 43 and, to a lesser degree, the muscles of the back 37 and the abdomen 49. The present invention 21 also eliminates the crushing effect on the soft tissue of the cyclist's 41 perineum 44, which soft tissue is compressed against the bones of the pubic symphysis 45 when using standard saddle-type seats of the existing art. The crushing effect at the perineum 44 occurs in the use of conventional saddle-type seats when the cyclist's 41 hips 42 rotate forward to cause the cyclist's 41 body weight to be supported on the forward horn of a saddle-type seat. It is the anterior angle of support 72 applied by the concave waist support 74 at the hips 42 of a cyclist 41 which support 74 upholds the forward rotation of the hips 42 and which anterior support 74 achieves an improved alternative support location to the predominant support of the existing art, which support is located between the legs 47 of the cyclist 41.

Figure 2:
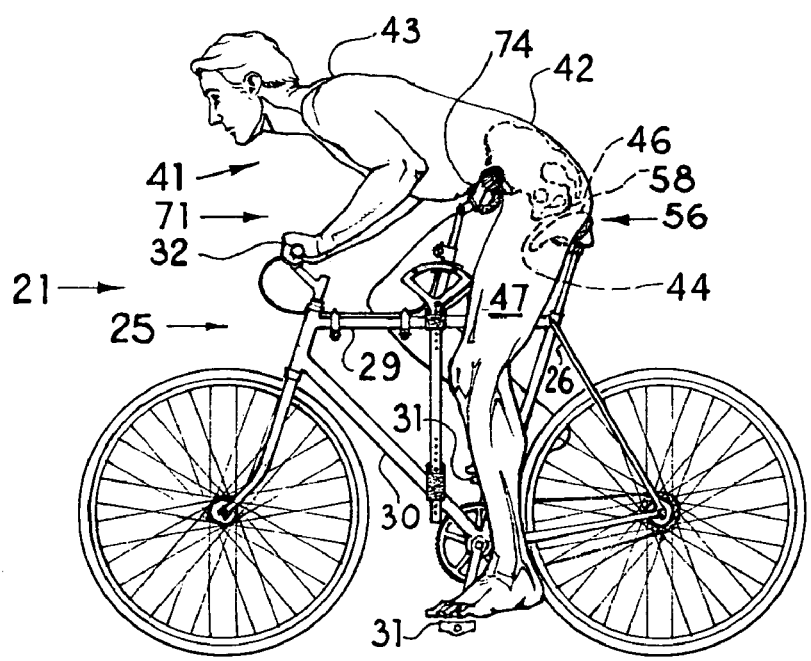
FIG. 2 depicts a lateral elevation view of a bicycle, on which bicycle is installed the present seating system, which seating system is depicted in a position to support the torso of a cyclist when the posture of the cyclist is a posture of being seated with a forward-leaning body position while riding on the bicycle, in accordance with the present invention.

In the drawing of FIG. 2 being a lateral elevation view of the present invention 21 installed on a conventional bicycle frame 26 and being used by a cyclist 41 in a posture of being seated and bent forward, it is depicted how the present invention 21 supports the bent-forward body posture of a seated cyclist 41. The bent-forward body posture is an alternative posture for a seated cyclist 41 and is a posture used for more strenuous pedalling by a cyclist 41 while remaining seated. The hips 42 rotate forward and the hips 42 remain supported by the concave waist support 74 of the anterior support device 71. The inclined angle of the posterior support surface 58 remains in support of the inferior surfaces of the cyclist's 41 ischial bones 46 while the posterior support surface 58 avoids contact with the cyclist's 41 perineum 44 because the posterior support surface 58 does not make use of a conventional type of seat horn to support the cyclist 41. The drawing of FIG. 2 further depicts how the concave waist support 74 acts to stabilize the hips 42 of the cyclist 41. The concave waist support 74 provides a stable line of support across the cyclist's 41 hips 42, against which support a cyclist 41 can leverage body weight in order to hold a fixed body position when increasing downward force on the bicycle 25 pedals 31. The concave waist support 74 also provides support for the cyclist's 41 upper body weight and relieves the shoulders 43 of the work of supporting the upper body weight. Providing support for the cyclist's 41 upper body weight also reduces the need for the cyclist 41 to rock from side to side and pull up alternately on the bicycle 25 handlebars 32 with either arm in order to increase downward force on each pedal 31 stroke being made by the legs 47 of the cyclist 41.

Figure 3:
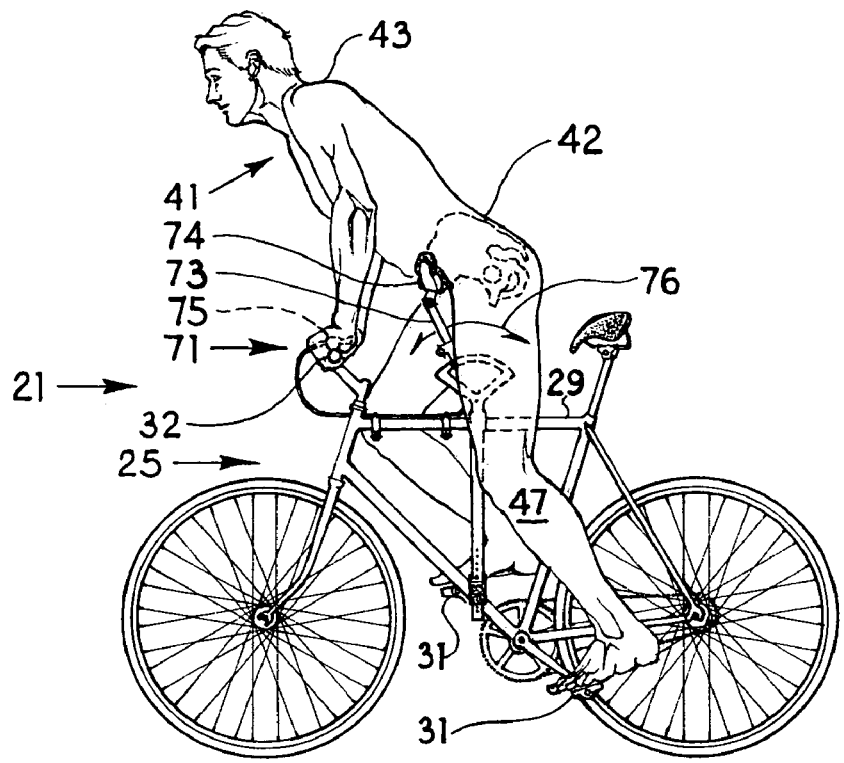
FIG. 3 depicts a lateral elevation view of a bicycle, on which bicycle is installed the present seating system, which seating system is depicted in a position supporting the torso of a cyclist when the posture of the cyclist is a posture of standing with an upright body position, while riding on the bicycle, in accordance with the present invention.

In the drawing of FIG. 3, being a lateral elevation view of a bicycle 25 on which bicycle 25 is installed the present invention 21, it is shown how the present invention 21 moves to a forward position to support a standing cyclist 41 in an upright body posture, which cyclist 41 is operating a bicycle 25. When a cyclist 41 moves from a seated riding posture to a standing riding posture it is necessary to press the spring release lever 75 of the anterior support device 71 which release lever 75 is attached to the handlebars 32 of the bicycle 25. The release lever 75 frees the anterior support buttress 73 to rotate forward 76 with the hips 42 of the cyclist 41 as the cyclist 41 moves to a standing posture. The anterior support buttress 73 stops and remains fixed at the forward position to support the cyclist's 41 hips 42 when the cyclist 41 is in a standing posture. The support buttress will remain in a forward position to further allow the cyclist 41 to stop the bicycle 25 and descend to a standing posture on the ground while the legs 47 of the cyclist 41 straddle the upper crossbar 29 of the bicycle 25. There are also advantages of utility seen in the cyclist's 41 standing riding posture depicted in FIG. 3. One advantage of utility is that the cyclist 41 can balance against the raised-up concave waist support 74 to reduce the extent of side to side rocking which occurs in standing riding of a bicycle 25 as the cyclist's 41 body weight must move alternately from a pedal 31 on one side of the bicycle 25 to the pedal 31 on the other side of the bicycle 25. A second advantage of utility is that the concave waist support 74 can be used as a surface of resistance against which the cyclist's 41 hips 42 can press in the act of pushing down and back on the bicycle 25 pedals 31. A third advantage of utility is that the cyclist's 41 shoulders 43 have a reduced burden of work in supporting the cyclist's 41 upper body weight. The anterior support buttress 73 may also be set in a forward position to the point that the anterior waist support 74 is not contacted by a cyclist's 41 body when riding a bicycle 25 in a standing body posture.

Figure 4:
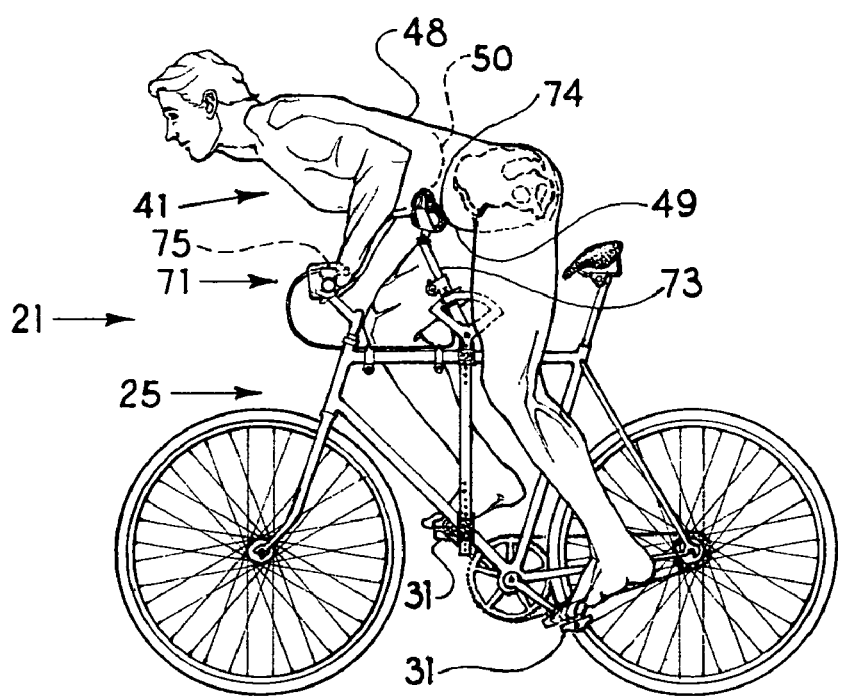
FIG. 4 depicts a lateral elevation view of a bicycle, on which bicycle is installed the present seating system, which seating system is depicted in a position to support the torso of a cyclist when the posture of the cyclist is a posture of standing with a forward-leaning body position, while riding on the bicycle, in accordance with the present invention.

In the drawing of FIG. 4 is depicted a lateral elevation view of a bicycle 25 on which bicycle 25 is installed the present invention 21, which seating system 21 is being used by a cyclist 41 in a standing and bent-forward body posture. The forward position of the anterior support buttress 73 is the same buttress 73 position depicted in FIG. 3. The forward position of the anterior support buttress 73 is accomplished by the same means as those means described within the description for FIG. 3 above. The spring release lever 75 is also used in the same way as the use indicated in the description accompanying FIG. 3 which use permits the anterior support buttress 73 to move forward from the held-back and rearward position used to support a seated cyclist 41. In the depiction of FIG. 4 is seen the fourth principal body posture used by a cyclist 41 in riding a bicycle 25. The body posture is that of a cyclist 41 standing on the pedals 31 in a bent-forward body posture. The seating system 21 affords additional advantages of use to the cyclist 41 in the standing bent-forward posture. The principal advantage of use in the standing bent-forward posture as allowed by the seating system 21 results from the opportunity for the thorax 48 of the cyclist 41 to rest on the concave waist support 74 of the anterior support device 71. In using the concave waist support 74 as a support balance the cyclist 41 can adjust the amount of body weight on the pedals 31 while operating the bicycle 25 in a standing bent-forward posture. Because the cyclist's 41 abdomen 49 can not effectively bear weight and maintain freedom of movement for breathing, the concave waist support 74 is best positioned forward on the cyclist's 41 thorax 48 to reach the location of the five false ribs 50, which false ribs 50 can support body weight without encumbering abdominal 49 breathing contractions.

Figure 5:
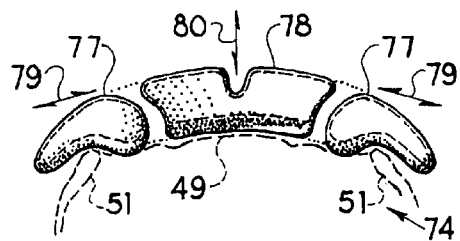
FIG. 5 depicts a plan view of the three seperate pads of the anterior support device of the seating system, this plan view being correspondingly aligned on sheet number 3/5, in graphic relationship directly above the elevation view of FIG. 6, in accordance with the present invention.

In the drawing of FIG. 5, being a plan view of the two anterior lateral support pads 77 and the anterior medial support pad 78 of the concave waist support 74, is shown the configured relationship of these three support pads 77 78 as seen from above the pads 77 78. The lateral pads 77 are seen to have a concave shape, which shape is established to conform to the shape of the iliac crests 51 beginning at the anterior superior iliac spines, which iliac crests 51 are the surfaces of supporting contact for the lateral pads 77. The anterior lateral pads 77 can also be moved laterally 79 to be adjustable to sizes to fit differing spreads in the iliac crests 51 of differing cyclists 41. The medial anterior pad 78 has a concave shape to receive the convex form of a cyclist's 41 abdomen 49. The medial anterior pad 78 can be moved both forward and rearward 80 in order to accommodate the differing abdominal 49 protrusions of differing cyclists 41.

Figure 6:
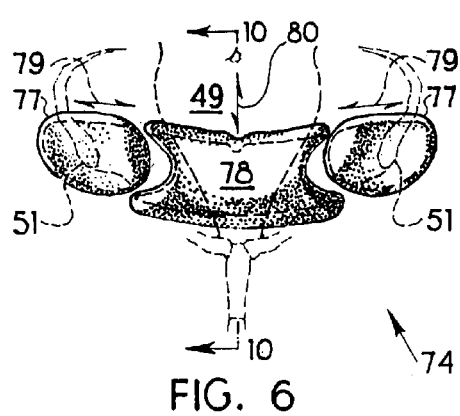
FIG. 6 depicts a posterior elevation view of the three seperate pads of the anterior support device of the seating system, this elevation view being correspondingly aligned on sheet number 3/5, in a graphic relationship directly below the plan view of FIG. 5, and in a graphic relationship directly beside the elevation view of FIG. 7, in accordance with the present invention.

In the drawing of FIG. 6, being a posterior elevation view of the two anterior lateral pads 77 and the anterior medial pad 78 of the concave waist support 74, is shown the elevational relationship of these pads 77 78. The lateral pads 77 are concavely shaped to receive the shape of the iliac crests 51 of the cyclist's 41 hips 42. The lateral pads 77 also move laterally 79 to adjust to the width of the iliac crests 51 of differing cyclists 41. The medial pad 78 is concave on the top surface to conform to the shape of the abdomen 49 beneath the navel 52. The medial pad 78 is also rounded on the inferior face of the pad 78 to provide a bearing surface for the cyclist 41 operating a bicycle 25 in a forward-leaning standing posture while the concave waist support 74 is in a forward and elevated position.

Figure 7:
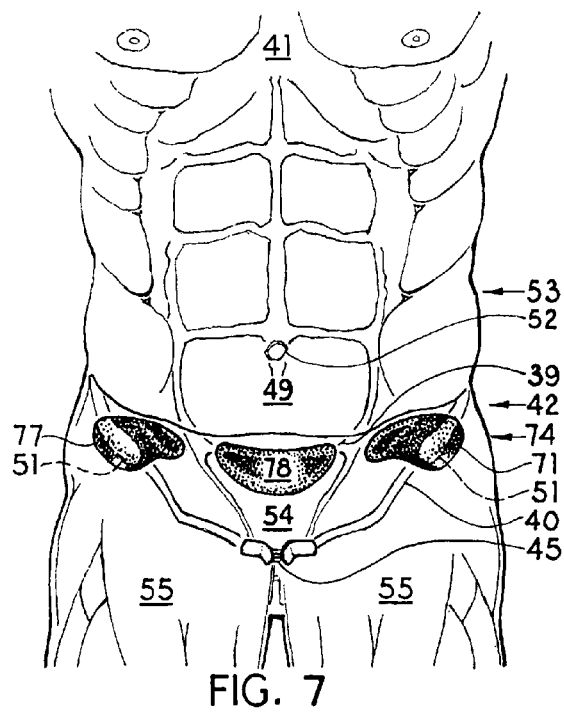
FIG. 7 depicts an anterior elevation view of a human torso, on which torso is indicated the areas of surface contact generally made on the torso by the three component pads of the anterior support device of the seating system, this elevation view being correspondingly aligned on sheet number 3/5, in a graphic relationship directly beside the posterior elevation view of FIG. 6, in accordance with the present invention.

In the drawing of FIG. 7, being an anterior elevation view, is depicted the anterior view of the human torso 53 on which torso 53 is indicated the three principal areas of supporting contact made on the torso 53 by the concave waist support 74 of the anterior support device 71. The lateral support pads 77 make contact with the iliac crests 51, being the crests of the iliac bones 51 of the cyclist's 41 hips 42. The lateral support pads 77 are formed concavely to make a fitted support around the convex protuberances of the iliac crests 51. The lateral pads 77 also curve around the medial faces of the iliac crests 51 to provide support in the areas between the iliac crests 51 and the lateral edges of the rectus abdominis muscle 54. The lateral pads 77 are further formed to make clearance with increased concavity on the inferior edges of the lateral pads 77 for the muscles of the upper legs 55 where these muscles attach at the iliac crests 51 and also where these leg muscles 55 attach to the inguinal ligaments 40, which ligaments 40 extend from the iliac crests 51 to the pubic symphysis 45. The lateral pads 77 are the primary surfaces of anterior support for the seating system 21. A secondary surface of support is the medial support pad 78 of the anterior support device 71. The lower abdomen 49 has a more limited capacity to support body weight because of the sensitive digestive and reproductive organs located in the abdomen 49. The pubic symphysis 45 is also sensitive to weight bearing and results in pain under contact of small forces. The top surface of the medial pad 78 is located at the lower edge of the line of abdominal fat, which line, being midway between the top of the pubic symphysis 45 and the navel 52, is proximate to the fourth transverse tendinous band 39 of the rectus abdominis muscle 54. The bottom edge of the medial pad 78 remains clear of the top of the pubic symphysis 45. The medial pad 78 crosses horizontally over the abdomen 49 between the medial edges of the lateral support pads 77. The areas supported by the medial and lateral pads 77 78 are areas on the pricipal width of line of support of the anterior support device 71 of the present invention 21.

The pubic symphysis 45 is also sensitive to weight bearing and results in pain under contact of small forces. The top surface of the medial pad 78 is located at the lower edge of the line of abdominal fat 39 which line 39 is midway between the top of the pubic symphasis 45 and the navel 52. The bottom edge of the medial pad 78 remains clear of the top of the pubic symphasis 45. The medial pad 78 crosses horizontally over the abdomen 49 between the medial edges of the lateral support pads 77. The areas supported by the medial and lateral pads 77 78 are areas on the principal line of support of the anterior support device 71 of the present invention 21.

Figure 8:
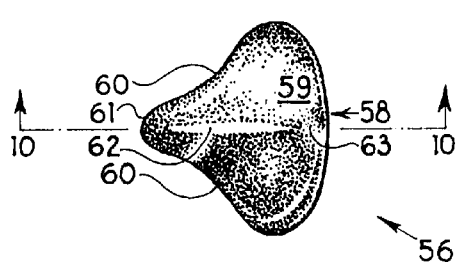
FIG. 8 depicts a plan view of the single support surface of the posterior support device of the seating system, this plan view being correspondingly aligned on sheet number 3/5, in a graphic relationship directly above the elevation view of FIG. 9, in accordance with the present invention.

In the drawing of FIG. 8, being a plan view of the superior surface 58 of the posterior support device 56, is depicted the plan of the perimeter profile and the support surface form of the posterior support device 56. The support surface 58 has a wide bearing area 59 to support the inferior faces of the bones 46. The wide bearing area 59 narrows in concave curves to a forward rounded tip 61. The concave curved edges 60 allow clearance for the posterior muscles of the leg 47. Aligned on the longitudinal center of the posterior support device 56 is a slightly raised ridge 62, tapering convexly into the rounded tip 61 and into the wide bearing area 59. Both the rounded tip 61 and the center ridge 62 are useful for center positioning on the posterior support surface 58. The center ridge 62 is concave on each side curving into the support surface 58 and is also useful for the purpose of increasing the area of the support surface 58 which surface area 58 makes supporting contact with the inferior prominences of the ischial bones 46, colloquially referred to as the 'sit-bones' of the hips 42.

Figure 9:
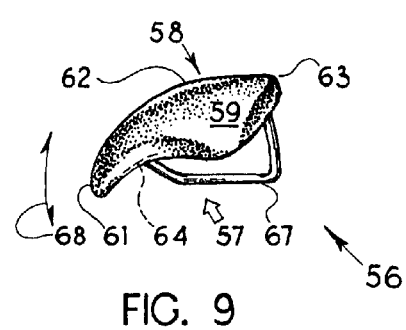
FIG. 9 depicts a lateral elevation view of the posterior support device of the seating system, this elevation view being correspondingly aligned on sheet number 3/5, in a graphic relationship directly below the plan view of FIG. 8, and in a graphic relationship directly beside the lateral section view of FIG. 10, in accordance with the present invention.

In the drawing of FIG. 9, being a lateral elevation view of the posterior support device 56, is depicted the form of the support surface 58 and the underside dual rods 67 of the posterior support device 56. The wide bearing area 59 of the support surface 58 is seen to curve down laterally to either side of the longitudinal center area 63. The support surface 58 is seen to continuously curve convexly along the longitudinal center area 63 from the back edge of the surface 58 to the rounded tip 61 at the front edge of the support surface 58. The rounded shape of the support surface 58 allows a greater range of rotational positioning of the posterior support surface 58 to increase the range of seating angles 68 which angles 68 coordinate with the positioning of the anterior concave waist support 74 of the anterior support device 71. Because the seating system 21 does not rely on a conventional saddle-type seat horn for vertically directed support of a cyclist 41, it is comfortable to add a raised center ridge surface 62 to the support surface 58 to make a stable seating surface by also contacting the medial inferior edges of the ischial bones 46 at a location just beneath the anus 38, while avoiding the soft tissues of the perineum 44. The underside of the support platform 64 is connected to an industry-standard type of dual rod carriage 67 for attachment to an industry-standard universal type seat clamp 28. The dual rod carriage 67 can be extended further back behind the support surface 58 to allow the posterior support device 56 to be comfortably moved further forward on the bicycle frame 26. Forward locations for the posterior support device 56 are still comfortable because of the absence of a conventional seat horn. A conventional seat horn makes seat locations more uncomfortable the further forward the seat locations are placed on the bicycle 25.

Figure 10:
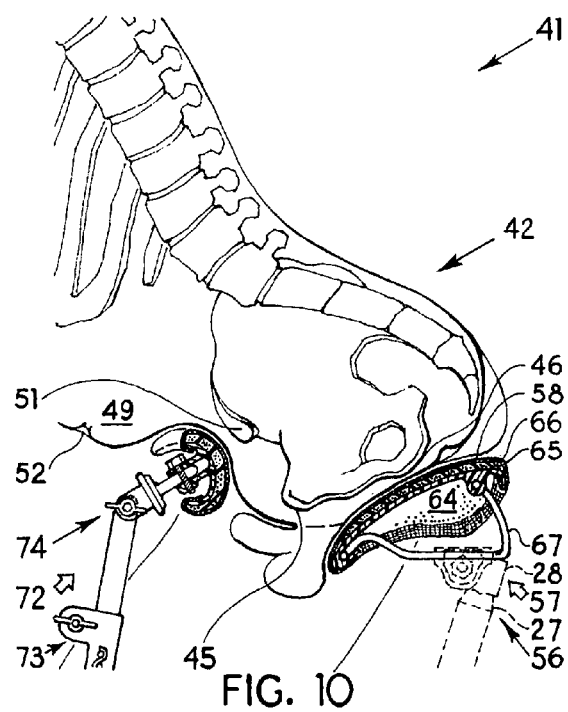
FIG. 10 depicts a lateral section view of the anterior and posterior support forms of the seating system, which support forms are depicted in the general relationship of the support forms to the anatomy of the torso of a cyclist which cyclist is in a seated posture on the seating system, this section view being correspondingly aligned on sheet number 3/5, in a graphic relationship directly beside the elevation view of FIG. 9, in accordance with the present invention.

In the drawing of FIG. 10, being a lateral section view of the posterior support device 56 and the concave waist support 74 of the anterior support device 71, it is depicted the relationship of the seating system 21 to the hips 42 of an occupying cyclist 41. The parts of the posterior support device 56 are seen in this sectional drawing. The dual rod carriage 67 is seen fastened to the underside of the plastic platform 64. The dual rod carriage 67 is attached to a conventional universal-type clamp 28 which clamp 28 is attached to a bicycle seat stem 27. The posterior support surface 58 is completed with a foam layer 65 and a fabric cover 66 over the platform 64. The position of the platform 64 in relationship to the inferior surfaces of the ischial bones 46 is seen as the relationship is set forth under the description for the drawing of FIG. 9. The top surface of the concave waist support 74 is depicted in relationship to the cyclist's 41 abdomen 49 at a point approximately equidistant between the navel 52 and the top of the pubic symphysis 45. Also seen depicted are the parts of the upper end of the anterior support buttress 73 connecting to the concave waist support 74, and the crest of the iliac bone 51 is included in the depiction. The stabilizing effect of the combination of the posterior support angle 57 with the anterior support angle 72 to accomplish a comfortable and supportive seating system 21 can be seen in the depiction of FIG. 10.

In the drawing of FIG. 11, being a sectional plan view of the anterior support device 71, is depicted the assembled parts of the anterior support device 71 as seen from above. The waist support plate 97 is seen to contain the medial T-plate 102 which plate 102 is shown as being cut in section. The medial pad 78 and the lateral pads 77 are located above the cut line of the sectional view, and the pads 77 78 are depicted being dotted in above locations. Below the waist support plate 97 is seen the arc guides 88 and the stop rods 89 which rods 89 are set into the arc guides 88 to limit the forward and rearward arc 76 of the buttress assembly 73. The release cable 112 connecting to the buttress assembly 73 is seen originating at the lever release 75 on the bicycle 25 handlebar 32.

In the drawing of FIG. 12, being a posterior section view of the anterior support device 71 of the seating system 21, it is depicted the assembled parts of the anterior support device 71 as seen from the viewing direction of a user-cyclist 41. It is seen that the lateral pads 77 are width-adjustable 79 in connections 109 to the waist support plate 97. The medial pad 78 is depth-adjustable 80 with the movable medial sleeve 106 on the medial T-plate 102, being slip connected with a pressure screw 108. The rotational adjustability 100 of the waist support plate 97 is seen at the pivot connection 98 to the extension bar 91. The positioning of the arcing tube 92 between the arc guides 88 is seen, as are the lateral spacers 118 between the arc guides 88. Also seen is the bar axle 87 for stable movement 76 of the arcing tube 92. The release lever 75 and release cable 112, which parts effect the release for the arcing tube's 92 movement 76, are depicted. The assembly of the upper compression fittings 82 and the lower compression fittings 83 onto the vertical tubes 81 are seen in relationship to the attachment of the vertical tubes 81 to the crossbars 29 30 of a bicycle frame 26 which tubes 81 are fixed in position by the use of compression screws 85. Also depicted are the plastic shells 122 shaped to be the base layers for the lateral pads 77. The lateral pad shells 122 are surfaced with a layer of conformable foam 65. The foam layer 65 has a finish surface of a fabric cover 66.

In the drawing of FIG. 13, being a lateral section view of the anterior support device 71, it is depicted how the arrangement of parts of the anterior support device 71 functions to support a cyclist 41 in the two principal postures of cycling. The two principal postures are a seated posture and a standing posture. In support of a seated cyclist 41 the support buttress 73 is automatically rotated back 76 by the urging effect of the spring hinge 93. The double sided latch 114 strikes and self-latches onto the rear stop rod 89. The latch 114 is held in place by effect of the set spring 115 located on the arcing tube 92. The concave waist support 74 is then fixed in position to give forward support 72 to a seated cyclist 41. In order for the cyclist 41 to move into a standing posture the release lever 75 is pressed, the release cable 112 retracts 120, and in connection to the cable 112 the latch 114 lifts 121 from the rear stop rod 89. As the cyclist 41 rises to a standing posture, the cyclist's 41 hips 42 apply force against the concave waist support 74 and cause the support buttress 73 to rotate forward 76. When the arcing tube 92 strikes the forward stop rod 89 the latch spring 115 causes the latch 114 to self-latch onto the forward stop rod 89. The forward stop rod 89 holds the support buttress 73 in a forward position. When the cyclist 41 returns to a seated posture, the buttress assembly 73 may be left in a forward position, or the buttress assembly 73 may be returned 76 to a rear supporting position 72. To return the buttress assembly 73 to a rear supporting position 72, the release lever 75 is pressed. The pressing of the release lever 75 pulls 120 the release cable 112 and releases the buttress assembly 73 by unlatching 121 the latch 114 from the forward stop rod 89. The spring hinge 93 at the rotational axle 87 of the arcing tube 92 then urges the buttress assembly 73 to arc rearward 76 to a latched position at the rear stop rod 89. Also depicted are the parts that make up the surface of support for the medial pad 78, being a base layer of a medical pad shell 122, a layer of conformable foam 65 and a surface finish of a fabric cover 66.

Figure 14:
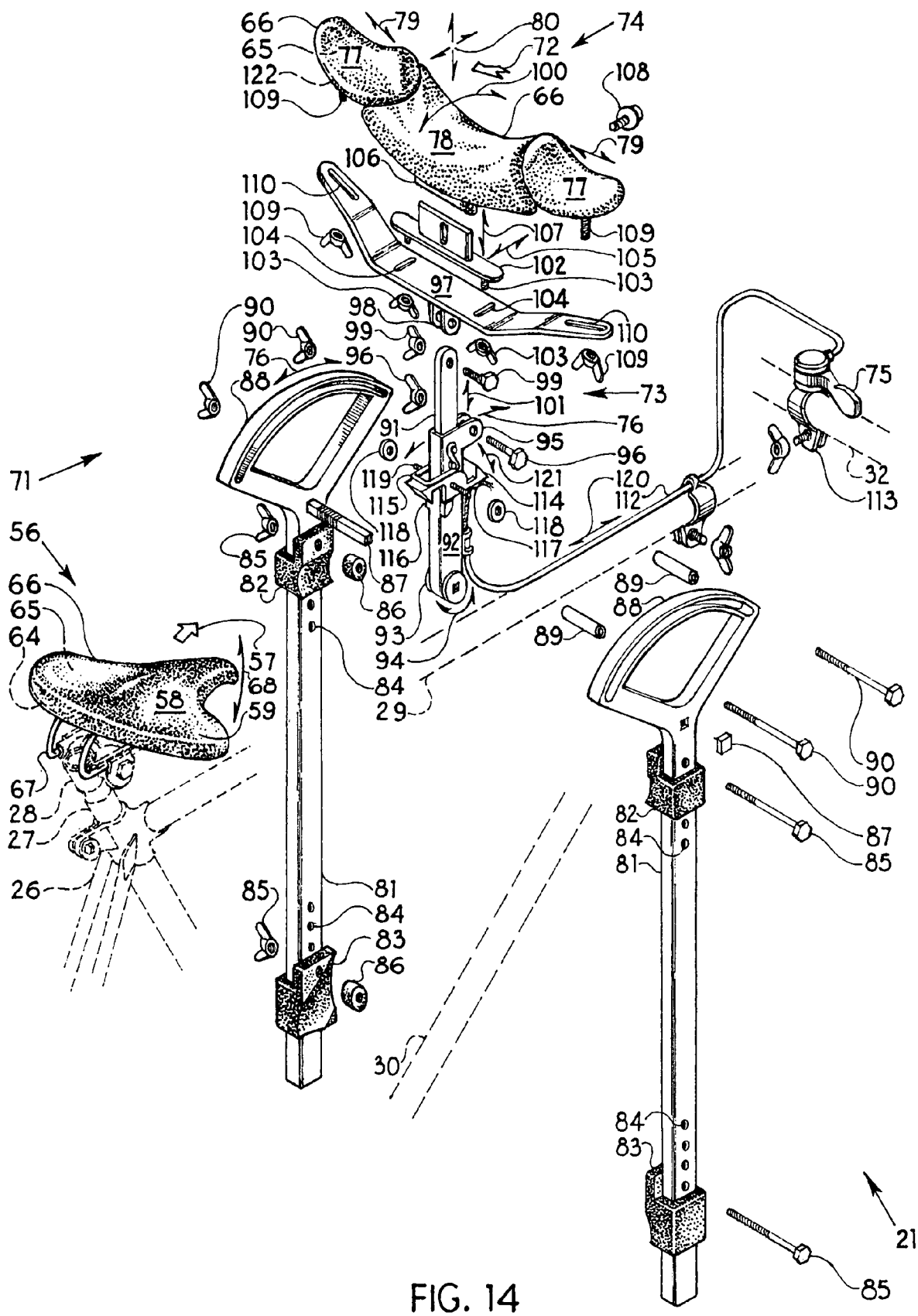
FIG. 14 depicts an axonometric exploded view as seen from the above right rear viewing position, which view is of the seating system positioned in relationship to the seat stem, crossbars and handlebar of a bicycle and which view is of a first embodiment of the present invention.

In the drawing of FIG. 14, being an exploded axonometric view of the parts of the seating system 21, it is depicted a view of the seating system 21 as seen from a point of view above and to the rear right side of the present invention 21. The posterior support device 56 is shown in assembled form. The dual rod carriage 67 is in a structural attachment to the underside of the support surface 58. The support surface 58 comprises a formed plastic platform 64, a conformable foam layer 65 and a fabric cover 66. The dual rod carriage 67 is shown attached to a universal seat clamp 28, which clamp 28 is affixed to a bicycle 25 seat stem 27 which stem 27 is attached to a bicycle frame 26. The rotational adjustability 68 for the posterior angle of support 57 is depicted.

Further in FIG. 14, the anterior support device 71 is shown in an exploded view. The anterior support device 71 includes vertical tubes 81 positioned on either side of a bicycle's 25 crossbars 29 30. The upper pair of plastic compression fittings 82 and a lower pair of compression fittings 83 slide on the length of the vertical tubes 81. The vertical tubes 81 have a plurality of holes 84 to allow for varied positioning on a bicycle's 25 crossbars 29 30. The vertical tubes 81 are fixed to the bicycle 25 crossbars 29 30 with compression screws and nuts 85, which screws 85 pass through the compression fittings 82 83 and through the holes 84 in the vertical tubes 81 in order to secure the vertical tubes 81 in selected fixed positions on the bicycle 25 crossbars 29 30. Plastic washers 86 for the compression screws 85 protect the finish surface of the bicycle 25 crossbars 29 30. The medial faces of the compression fittings 83 are formed to fit to the size and angle of varying bicycle 25 crossbars 29 30. The vertical tubes 81 are held together in parallel alignment by a horizontally sliding bar axle 87 which axle 87 allows the space between the vertical tubes 81 to be adjustable to fit the widths of varying bicycle 25 crossbars 29 30. The tops of the vertical tubes 81 extend into attachment to the arc guides 88 which guides 88 control the range of motion of the support buttress 73 being incorporated into the frame 26 of the bicycle 25 by the vertical tubes 81. The forward and rearward limits of motion 76 of the buttress 73 are Set by movable stop rods 89 between the arc guides 88 being connected by the axle 87. The stop rods 89 are fixed in position by two stop rod screws and nuts 90. The length of the stop rods 89 is dimensioned according to the width of the bicycle 25 crossbars 29 30.

Also in FIG. 14 it is depicted that the support buttress 73 is made up of the concave waist support 74, the extension bar 91 and the arcing tube 92. The arcing tube 92 connects to the axle 87. At the base of the arcing tube 92 is the spring hinge 93 which hinge 93 rotates in urging 94 the arcing tube 92 toward the posterior support device 56. At the top of the arcing tube 92 are located two compression tabs 95 and a tab screw and nut 96 which compression tabs 95 make a connection to fix the functional length of the movable 101 extension bar 91. The waist support plate 97 attaches to the top of the extension bar 91 with a pivot fitting 98. A pivot screw and nut 99 tightens the pivot fitting 98 and secures the position of the angle of inclination of the rotationally adjustable 100 waist support plate 97. The T-plate 102 for the medial pad 78 connects with screws 103 to the medial portion of the waist support plate 97 in slots 104 for up and down adjustment 105 of the medial pad 78. The plastic sleeve 106 for the medial pad 78 slides 107 onto the medial T-plate 102 and the sleeve 106 is fixed in position by a pressure screw 108. The T-plate 102 and medial sleeve 106 allow for the medial pad 78 to be adjustable 80 in two directions: the direction of in and out 107 and the direction of up and down 105. The movements 105 107 of the medial pad 78 make allowance for the medial pad 78 to accommodate varying abdominal protrusions. The lateral pads 77 are repositionably width-adjustable 79 in slots 110 within the ends of the waist support plate 97. Lateral pad 77 positions are fixed by the use of tightening screws and nuts 109. The medial pad 78 and the two lateral pads 77 are assembled similarly to the posterior support surface 58 indicated in the description of the drawing of FIG. 10 above. The pads 77 78 are made up of three principal parts. The base layer of the pads 77 78 are the plastic shells 122 which shells 122 include on the undersides the parts of the medial sleeve 106 and the screws 109 for the lateral pads 77. On top of the plastic shells 122 is a layer of conformable foam 65. The foam 65 and the shells 122 are wrapped together by a fabric cover 66.

Finally, in FIG. 14 it is depicted that the release of the anterior support buttress 73 to rotate 76 is caused by the spring release lever 75. The release lever 75 is secured to the bicycle 25 handlebars 32 by a screw clamp 113. The spring release lever 75 is connected to the double sided latch 114 by a release cable 112. The latch 114 is held in place by a set spring 115 and latch stops 116 located on the arcing tube 92 of the support buttress 73. The release cable 112 is length-adjustable with a set screw 117 at the latch 114. The lateral stability of the arcing tube 92 is controlled supplementally by the lateral spacers 118 on the axis 119 of the latch 114.

There exist numerous opportunities and possibilities for the application of additions to, and adjustments in, the embodiment of the present invention 21. Such optional additions to, and adjustments in, the embodiment of the present invention 21 include, but are not limited to, the enumerated examples of additions and adjustments here following;

1. The embodiment of the seating system 21 includes descriptions of a full range of adjustability in the positioning and angles of direction of the component parts of the seating system 21. The seating system 21 may further incorporate variations in the sizes of parts, and in the scale of the overall seating system 21. Changes in parts, sizes and in overall scale can be made for the purpose of accomplishing more suitable fits to the physical dimensions and proportions of a variety of user body types, which various body types include those of men, women and children.

2. The seating system 21 can be made in an embodiment, in which embodiment the seating system 21 is particular to, and integral with, the structure or the frame 26 of an individual bicycle 25 or model of a bicycle 25, or other device where the seating system 21 is useful.

3. The anterior support device 71 of the seating system 21 can be employed on a bicycle 25, or in another useful application, such that the anterior waist support 74 does not move rearward and downward 76 to a descended location to support the hips 42 of a cyclist 41 in a seated posture. The anterior support device 71 can be applied for the purpose of providing a surface of support 72 for a cyclist 41, which cyclist 41 is cycling in a standing posture. The waist support 74 can retain adjustability of sizing and positioning. The function of the arcing movement 76 of the seating system 21 can be obviated in the application of the anterior waist support 74 as a fixed positionable body support surface for the body of a user in a standing posture.

4. The anterior medial pad 78 movements 80 can be expanded to include the rotational movement of the medial support surface 78, which rotation would occur by effect of surface contact with the abdomen 49 of a cyclist 41, as the body of the cyclist 41 would ascend and descend, in the act of pedalling a bicycle 25 when the cyclist 41 is in a standing posture.

5. The medial support pad 78 can be substituted with a belt type of support surface, which belt type of support would span between the lateral support pads 77 of the anterior waist support 74. Such a belt type of support could be lengthened or shortened between the lateral support pads 77, which length adjustments would result in adjustability 80 in the depth and height positioning of the medial support belt. Such adjustability in the medial support belt would achieve a function of adjustability similar to the djustability 80 of the medial support pad 78 of the present embodiment 21.

6. In the anterior support device 71 of the present invention 21, the upper compression fittings 82 and the lower compression fittings 83, are set forth as being seperate parts from the vertical tube 81 parts. The upper and lower compression fittings 82 83 can be substituted with a compressible material applied to, and integral with, the medial faces of the vertical tubes 81. Such a composite of parts would similarly serve the established function of securing the location of the vertical tubes 81 on the crossbars 29 30 of a bicycle 25.

7. In the anterior support device 71 of the present invention 21, the forward and rearward arcing movement 76 of the anterior waist support 74 is accomplished by means of the movement of the anterior buttress assembly 73 within the arc guides 88 of the anterior support device 71. The arc guides 88 can be substituted by the more compact device of a rotating hub, which rotating hub would effect the same arcing movement as that movement 76 effected by the arc guides 88 of the present embodiment 21. The forward and rearward movement 76 of the anterior support buttress 73 can also be similarly accomplished by means of the linear movement of a sliding device, which sliding would substitute for the arcing movement 76 of the present embodiment 21.

8. In the anterior support device 71 of the present embodiment 21, it is above set forth that there exist advantages of comfort resulting from a reduction in direct vertical loading at the hips 42 of a cyclist 41. An improved loading condition results from a combination of posterior 57 and anterior 72 directions of support for the cyclist. The jarring effects of dynamic load transfer to the hips 42 of a cyclist 41 can be further ameliorated by the incorporation of elements of flexibility in the anterior support assembly 73. One opportunity for increasing flexibility in the anterior waist support 74 is in the introduction of flexibility into the waist support plate 97, which flexibility would result in a level of elastic rebound for the anterior lateral pad supports 77. A second opportunity for increasing flexibility in the anterior waist support 74 is in the addition of a spring function to the top of the extension bar 91, which spring would be structurally integral in the line of the compressive length of the extension bar 91.

Examples of adjustments in, and additions to, the present invention 21 are described here for the purpose of illustrating possibilities within the scope and the spirit of the invention 21; such examples are intended to be neither comprehensive, nor are such examples intended to be indicative of the limits of possible adjustments in, and additions to, the embodiment 21 of the present invention 21.

Numerous Characteristics and advantages of the invention 21 have been set forth in the foregoing description. The foregoing description of the embodiment of the present invention 21 is presented for purposes of illustration and explanation. The spirit and scope of the present invention 21 are not limited by the embodiment described above. The above descriptions are not intended to be exhaustive, nor to limit the invention 21 to the precise form disclosed. In light of the above teachings, many modifications and variations of the invention 21 are possible. It will be understood by those skilled in the art that a variety of changes in the form and detail of the present embodiment may be made without departing from the principle of the present invention 21. The disclosure anticipates changes that may be made in detail and in matters of size, shape and arrangements of parts that are within the principle of the invention 21. The present invention 21 has been particularly shown and described with reference to an embodiment of a seating system for a bicycle 25. Since changes and adjustments may vary to fit particular operating requirements and environments, it will be understood that the principle of the invention 21 is not limited to the specific embodiment herein described. It is understood that the herein described seating system 21 can be used for other purposes and in other applications. The seating system 21 can be used for a variety of equipment, such as furniture and in any application where seating or body support is appropriate. Such applications and modifications are anticipated by the present invention 21, with details of structure, function and novel features of the invention 21. The present embodiment encompasses any and all embodiments within the spirit and scope of the present invention 21. The appended claims are for the limited purpose of declaring what is generally new and original in the purposes, means and product of the art of the present invention 21. The spirit and scope of the present invention 21 are measured to the full extent indicated by the broadest general meaning of the terms in which the here appended claims are expressed.

What is claimed is:

1. A seating system for the torso of the human body, said seating system providing surfaces of anterior support for the hips of the human body by an anterior support device comprising:
   (a) a waist support plate having a first lateral end and a second lateral end;
   (b) a first lateral pad having a concavely shaped surface of support for making contact supporting the convex protuberance of a first iliac crest of the hips of the human body;
   (c) a second lateral pad having a concavely shaped surface of support for making contact supporting the convex protuberance of a second iliac crest of the hips of the human body;
   (d) a first adjustable connection for connecting said first lateral pad within the first lateral end of said waist support plate for holding said first lateral pad in an adjusted position; and
   (e) a second adjustable connection for connecting said second lateral pad within the second lateral end of said waist support plate for holding said second lateral pad in an adjusted position; whereby
said waist support plate is a supporting part connecting to the two lateral pads in the adjustable connections for adjusting the width of spread of said two lateral pads to be held in fixed positions, so as to be able to provide support for a width of spread between the two protuberances of the iliac crests of the torso of a human body.

2. The anterior support device according to claim 1, further comprising respectively:
   (a) a first formed inferior edge of increased concavity and a second formed inferior edge of increased concavity; on
   (b) said first lateral pad and said second lateral pad; whereby
said two lateral pads provide increased clearance at the inferior edges for the muscles of the upper legs attaching at the iliac crests and to the inguinal ligaments.

3. The anterior support device according to claim 2, further including said first lateral pad and said second lateral pad comprising:
   (a) a first lateral pad shell being a base layer for the surface of support of said first lateral pad; and a second lateral pad shell being a base layer for the surface of support of said second lateral pad; and
   (b) a layer of foam on the surface of support of each lateral pad shell, said layer of foam for the surface conformability of said two lateral pads; whereby
said two lateral pads are shaped to provide formed support for the convex protuberances of the iliac crests.

4. The anterior support device according to claim 1, further including said adjustable connections for said two lateral pads, comprising:
   (a) a slot for one lateral pad within each lateral end of said waist support plate; and
   (b) a screw on each said lateral pad with one nut for each said screw; whereby
said two lateral pads are adjustable to fixed positions in each said slot on said waist support plate.

5. The anterior support device according to claim 1, further including an anterior medial surface of support comprising:

(a) a medial pad located between said two lateral pads; whereby
said medial pad is positionable to provide supplemental augmentation for the anterior support provided by said two lateral pads.

6. The anterior support device according to claim 5, further including said medial pad comprising:
   (a) a medial pad shell;
   (b) an underside of said medial pad shell having a connection for said medial pad to be adjustable in one direction;
   (c) a medial portion of said waist support plate having a connection for said medial pad to be adjustable in a second direction; and
   (d) means for connecting the underside of said medial pad shell with the medial portion of said waist support plate so as to be able to move said medial pad to adjusted positions in two directions; whereby
said medial pad is positionable proximate to the fourth transverse tendinous band of the rectus abdominis muscle.

7. The anterior support device according to claim 1, wherein said waist support plate further comprises:
   (a) a bicycle, so as to be useful to a cyclist for engaging in the act of cycling; and
   (b) means for installing said waist support plate on the bicycle by parts arranged to fit to the bicycle; whereby
said waist support plate and said two lateral pads connected thereto are installed on the bicycle so as to be able to provide support for the torso of the cyclist.

8. The anterior support device according to claim 1, further including parts for adjusting the angle of inclination of said waist support plate, the parts comprising:
   (a) a pivot fitting on said waist support plate;
   (b) an extension bar connecting to said pivot fitting; and
   (c) means for connecting said pivot fitting to said extension bar so as to be able to move said waist support plate to an adjusted angle relative to said extension bar; whereby
said two lateral pads are adjustable to different angles of inclination for supporting the torso of the human body.

9. The anterior support device according to claim 8, further including a mechanics of movement for moving said two lateral pads alternately to forward and rearward fixed positions, the mechanics of movement comprising:
   (a) an arcing tube shaped for connection to said extension bar for said extension bar to be lengthwise movable;
   (b) an unconnected end of said extension bar for connecting to said arcing tube;
   (c) means for fixing said arcing tube in a connection to said extension bar so as to be able to fix the functional length of said extension bar;
   (d) a spring hinge at the base of said arcing tube, said spring hinge having a rearward urgency;
   (e) an axle for said spring hinge, said axle being the axle for the rotational movement of said spring hinge;
   (f) two arc guides, one arc guide on each side of said arcing tube, said arc guides being connected by said axle for said arcing tube to arc between said arc guides;
   (g) two stop rods, being a forward stop rod and a rearward stop rod, said stop rods being movable to fixed positions in said arc guides for setting the limits of the movement of said arcing tube;
   (h) means for positioning said two stop rods in said arc guides so as to be able to fix said two stop rods in adjusted positions;
   (i) a latch on said arcing tube, said latch for self-latching to said forward stop rod and said rearward stop rod upon contact therewith;
   (j) a release cable, said latch being connected to one end of said release cable for unlatching said latch;
   (k) means for connecting said release cable to said latch so as to be able to adjust the length of said release cable; and
   (l) a release lever connecting to one end of said release cable; whereby
said arcing tube now latching forward, the pressing of said release lever moving said release cable and retracting said latch from said forward stop rod, the urging of said spring hinge moving said arcing tube rearward to self-latch to said rearward stop rod;
and further whereby
the pressing of said release lever unlatching said arcing tube from said rearward stop rod, thereby releasing said arcing tube to be moved forward by application of a forward directed force.

10. The anterior support device according to claim 9, further including an assembly of parts for attaching the mechanics of movement to a bicycle, the assembly of parts comprising:
    (a) two vertical tubes, each vertical tube having a plurality of holes and each said vertical tube extending down from attachment to one said arc guide on each side of the crossbars of the bicycle;
    (b) two upper compression fittings, one upper compression fitting sliding on each said vertical tube, said upper compression, fittings being for the upper crossbar of the bicycle;
    (c) two lower compression fittings, one lower compression fitting sliding on each said vertical tube, said lower compression fittings being for the lower crossbar of the bicycle; and
    (d) means for connecting one said vertical tube to the other said vertical tube for holding said upper and said lower compression fittings so as to be able to fix said two vertical tubes in adjusted positions on said crossbars of the bicycle; whereby
said vertical tubes, in attachment to said arc guides, incorporate the mechanics of movement into the frame of the bicycle.

11. The anterior support device according to claim 1, further including a complementary posterior support for the hips of the human body, being a posterior support device comprising:
    (a) a posterior support surface being continuously convex along a longitudinal center from a rounded tip to a wide bearing area rearward; and
    (b) a raised center ridge on said posterior support surface being:
       (1) raised in a convex curvature along said longitudinal center and tapering into said rounded tip and into said wide bearing area, and
       (2) concavely formed on each side, each side curving laterally into said posterior support surface; whereby
the configuration of two concave sides on a convexly curving ridge directs supportive contact on the hips to be on and between the inferior prominences of the ischial bones, colloquially referred to as the 'sit-bones' of the hips.

12. The anterior support device according to claim 11, wherein said posterior support surface further includes two layers comprising:
    (a) a platform shaped as a base layer for the shape of said posterior support surface; and (b) a foam layer over said platform for conformability in said posterior support surface.

13. The anterior support device according to claim 12, further including said posterior support device comprising a dual rod carriage structurally attached to carry said platform, said dual rod carriage for connecting to a bicycle seat clamp.

14. A method of providing support for the front of the human torso on the crests of the iliac bones, comprising:
 (a) providing a generally horizontal structural member;
 (b) forming two shaped support surfaces for the shapes of said crests of the iliac bones, being the iliac crests of the human torso;
 (c) incorporating repositionable connections into said shaped support surfaces and into said generally horizontal structural member for said shaped support surfaces to be adjustable to different widths of spread;
 (d) fixing said shaped support surfaces at an adjusted width of spread for the width of spread of the iliac crests of a person to be supported; and
 (e) placing the iliac crests of the person against said shaped support surfaces; whereby
said generally horizontal structural member is positionable for holding said shaped support surfaces so as to be able to stably support the torso of the person in an inclined posture, the person maintaining body balance, limb movement, breathing capacity and physical comfort.

15. The method according to claim 14 of providing support for the front of the human torso, further including moving said shaped support surfaces alternately forward and rearward between two adjusted fixed positions, comprising:
 (a) attaching said generally horizontal structural member to a buttress member for supporting said generally horizontal structural member;
 (b) combining a rearward urging movement with said buttress member for an automatic rearward movement of said buttress member;
 (c) installing adjustable forward and adjustable rearward limits with said buttress member for adjusting a forward and rearward range of movement for said buttress member;
 (d) including a releasable latch at said adjustable forward and said adjustable rearward limits of movement for said buttress member for latching said buttress member in forward and rearward adjusted positions;
 (e) connecting a latch release to said adjustable forward and said adjustable rearward limits of movement for said buttress member, said latch release for releasing said buttress member from the adjusted forward and the adjusted rearward latched positions; and
 (f) locating the person in a position to place the iliac crests of the person against said shaped support surfaces, and further locating the person so as to be able to access said latch release; whereby
said generally horizontal structural member being attached to said buttress member, said buttress member is positionable to be latched at the adjusted forward and the adjusted rearward latched positions, in order that alternately:
 (1) said buttress member being released from the forward latched position, said rearward urging movement automatically moves said buttress member to the rearward latched position for said shaped support surfaces to be held to support the front of the human torso, and
 (2) said buttress member being released from the rearward latched position, said buttress member is movable to be returned to the forward latched position by the person moving forward against said shaped support surfaces.

\* \* \* \* \*